June 26, 1962 B. TOCCI-GUILBERT 3,040,485
RESILIENT COUPLING
Filed July 16, 1959 2 Sheets-Sheet 1
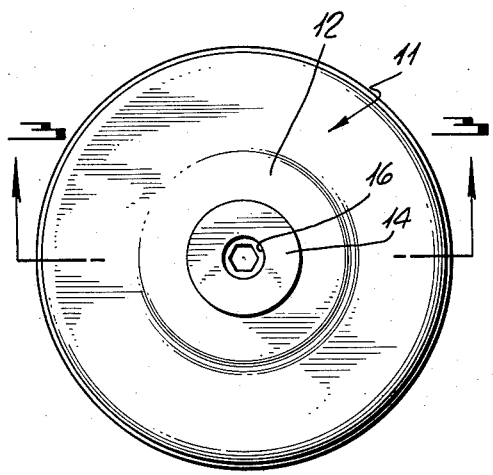
FIG_1
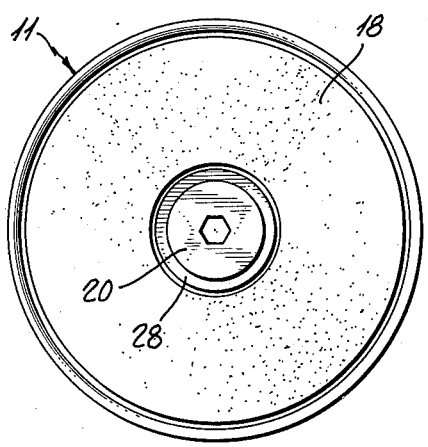
FIG_2
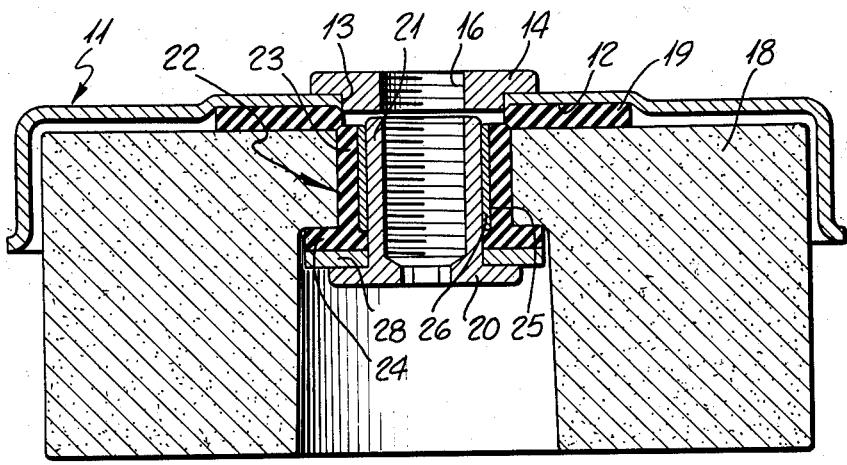
FIG_3
BERNE TOCCI-GUILBERT
INVENTOR.
BY *Flehr & Swain*
ATTORNEYS June 26, 1962  B. TOCCI-GUILBERT  3,040,485
RESILIENT COUPLING
Filed July 16, 1959  2 Sheets-Sheet 2
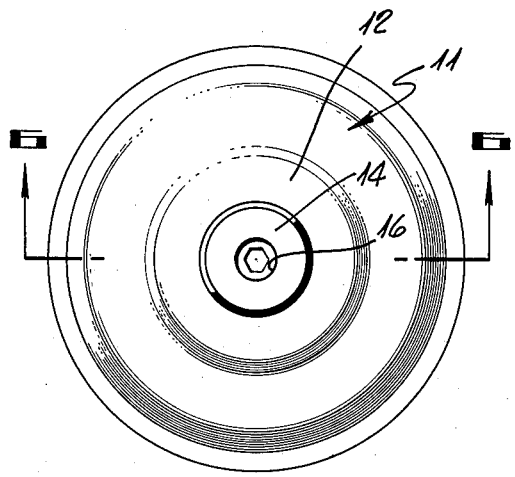
FIG_4
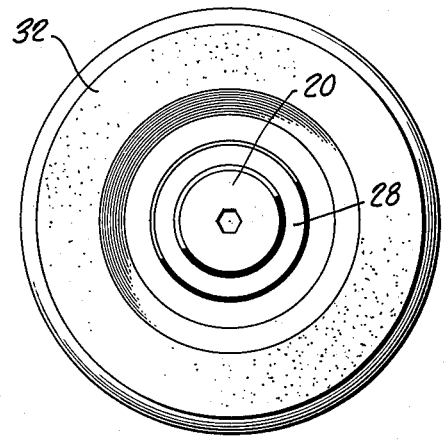
FIG_5
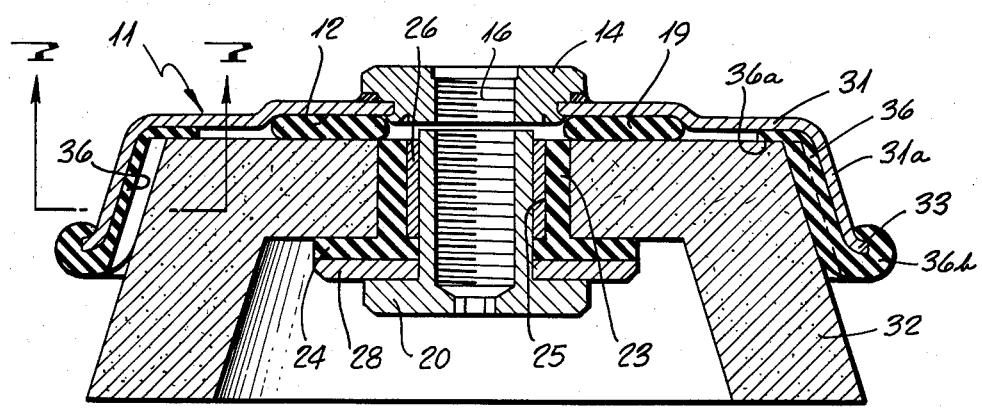
FIG_6
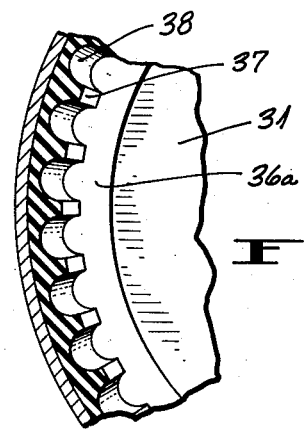
FIG_7
BERNE TOCCI-GUILBERT
INVENTOR.
BY
ATTORNEYS

United States Patent Office 3,040,485
Patented June 26, 1962

3,040,485
RESILIENT COUPLING
Berne Tocci-Guilbert, 2323 Larkin St.,
San Francisco, Calif.
Filed July 16, 1959, Ser. No. 827,555
7 Claims. (Cl. 51—209)

This invention relates to a resilient coupling and more particularly to a resilient coupling for abrasive cup wheels.

Resilient couplings have heretofore been provided for abrasive wheels of certain types and are disclosed in Patents 2,486,078, 2,629,990 and 2,633,008. However, it has been found that such resilient couplings are not particularly adapted for use with cup wheels where the cup wheels are utilized for heavy duty applications such as snagging. There is, therefore, a need for the heavy duty type of resilient coupling which can be utilized with abrasive cup wheels.

In general, it is an object of the present invention to provide a resilient coupling which is particularly adapted for use with cup wheels.

Another object of the invention is to provide a resilient coupling of the above character which is particularly adapted for use with cup wheels utilized in heavy duty applications.

Another object of the invention is to provide a coupling of the above character which can withstand high impact loads but which still retains all of the advantages of a resilient coupling.

Another object of the invention is to provide a resilient coupling of the above character which makes the grinding wheel safer and easier to operate.

Additional objects and features of the invention will appear from the following description in which the preferred embodiment has been set forth in detail in conjunction with the accompanying drawings.

Referring to the drawings:

FIGURE 1 is a rear elevational view of a resilient coupling embodying the present invention mounted on a cup wheel.

FIGURE 2 is a front elevational view of the resilient coupling and cup wheel shown in FIGURE 1.

FIGURE 3 is a cross-sectional view taken along the line 3—3 of FIGURE 1.

FIGURE 4 is a rear elevational view of another embodiment of my resilient coupling mounted on a cup wheel.

FIGURE 5 is a front elevational view of the resilient coupling and cup wheel shown in FIGURE 4.

FIGURE 6 is a cross sectional view taken along the line 6—6 of FIGURE 5.

FIGURE 7 is a partial cross-sectional view taken along the line 7—7 of FIGURE 6.

The resilient mounting as shown in FIGURES 1 to 3 of the drawings consists of a rigid cup-shaped guard member 11 formed of suitable material such as metal. The guard member 11 is provided with a centrally disposed annular recess 12 in the bottom wall of the guard member. The annular recess is formed with a central opening 13 in which is affixed a collar 14 having a threaded central opening 16. The outer edge of the side wall of the guard member is flared outwardly as shown in the drawing.

As will be noted from the drawing, a cup wheel 18 of a type well known to those skilled in the art is adapted to be mounted in the guard member 11. The guard member 11 is of such a size that it is slightly larger than the outer diameter of the cup wheel. The cup wheel 18 is adapted to be supported above the bottom surface of the guard member by an annular member 19 of suitable resilient material such as rubber disposed in the annular recess 12. As shown, the annular member is of such a thickness that it supports the cup wheel well above the bottom surface of the guard member.

The guard member and the cup wheel are adapted to be mounted upon the rotating spindle (not shown) of the driving device utilized. Means is provided for securing the cup wheel and the guard member to the spindle and consists of a threaded central hub 20, provided with a radially extending flange 21. An assembly 22 is provided for resiliently mounting the hub 20 in the cup wheel and consists of a cylindrical member 23 provided with a radially extending flange 24 formed of suitable resilient material such as rubber. A cylindrical bushing 26 of suitable material such as brass or steel is mounted within a cylindrical recess provided in the bore 25 of the member 23 and is bonded to the member 23 to form a part thereof. A washer 28 having substantially the same diameter as the outer diameter of the flange 24 is bonded to the flange 24 and forms a part thereof. The washer 28, as shown in FIGURE 3 of the drawing, is adapted to be engaged by the flange 21 of the hub 20.

Use of the resilient coupling shown in FIGURES 1 to 3 may now be briefly described as follows. Let it be assumed that the cup wheel has been mounted upon the spindle of the driving machine or device by first mounting the guard member 11 with its annular resilient member 19 on the spindle and that the assembly 22 has been mounted in the central bore of the cup wheel and that the cup wheel and the assembly 22 have been secured to the spindle by the central hub 20.

As soon as the central hub 20 has been firmly secured to the spindle, the driving machine may be placed in operation to cause rotation of the spindle and the cup-shaped grinding wheel. The driving forces are transmitted to the cup wheel through the resilient members 19 and 23 serving to mount the cup wheel. At no point is there a rigid connection between the cup wheel and the driving members. The use of the rubber members for driving the cup wheel serves to effectively dampen any vibration which may be set up as the grinding wheel is utilized for conventional grinding operations such as snagging, the surfacing of stone, terrazzo, marble floors, steel decks, and the like. By utilization of the resilient members, it has been found that a gyroscopic effect is obtained, which serves to maintain the grinding wheel in the desired location with very little effort. There is very little, if any, tendency for the grinding wheel to shift from one position to another. Shock forces applied to the grinding wheel are generally reduced. Any vibrations which are set up are dampened out very rapidly.

Another embodiment of my resilient coupling is shown in FIGURES 4 to 7 of the drawings. As will be noted from the drawings, it is very similar in many respects to the resilient coupling shown in FIGURES 1 to 3 of the drawing. The guard member 31 however is flared outwardly to accommodate the flaring cup wheel 32. The guard member 31 also has an outwardly extending lip 33. The guard member 31 has a size which is substantially greater than the size of the cup wheel so that it can be utilized for accommodating cup wheels of slightly different sizes as hereinafter described.

The resilient mounting as shown in FIGURES 4 to 7 includes in addition to the components shown in FIGURES 1 to 3 a corrugated skirt 36 of a suitable resilient material such as rubber or cork which covers the inner wall of the flaring portion 31a of the guard member 31. In addition, the resilient skirt is provided with a portion 36a which is adapted to underlie the surface of the cup wheel 32 and which is disposed between the under or bottom surface of cup wheel 32 and the guard member 31. This portion as shown has a thickness which is substantially less than the other portion of the skirt member 36. The skirt member in addition is provided with a curved portion 36b which encloses the lip 33 of the guard member 31. The skirt member 36 as shown particularly in FIGURE 7 is provided with a plurality of raised portions or projections 37 which extend inwardly from the inner wall of the flared portion of the guard member 31 for a distance which is normally substantially greater than the spacing between the cup wheel and the guard member. Thus when the cup wheel is mounted in the guard member, the resilient skirt member is compressed slightly so that the resilient skirt member firmly engages the outer side wall of the cup wheel 32. The spaces 38 between the raised portions of projections 37 of the resilient skirt member facilitate compression of the resilient skirt member by the cup wheel when the cup wheel is placed within the guard member. Since these raised up portions are readily compressible, cup wheels having slightly different sizes may be utilized with the same resilient mounting.

Use of this resilient mounting is very similar to that described in conjunction with the resilient mounting shown in FIGURES 1 to 3. The resilient skirt 36 acts as a secondary cushion for the cup wheel. The skirt therefore serves as a stabilizer, a centralizer, and a dampener.

As it is well known to those skilled in the art cup wheels of the type shown in the drawings are particularly adapted for grinding operations in which the cup wheel is continuously used on an edge to remove welds and the like. However, after the weld has been removed, it may be desirable to remove the scoring marks which have been left by the use of the grinding wheel in this manner. To do this, it is merely necessary to place the whole exposed face to the grinding wheel in contact with the surface to be ground. When the grinding wheel is positioned in this manner, there is an oscillating effect created because of the distortion of the resilent cushion or members which produces a lateral movement. This lateral movement in conjunction with the driving torque transmitted to the grinding wheel causes a constant orbital movement of the grinding wheel over the surface being ground to thereby produce a floating action which makes it possible to grind such surfaces without concentric scoring. This oscillatory movement of the grinding wheel also greatly reduces clogging or loading of the grinding wheel. Although the resilient mounting has been shown primarily for use with straight sided and flaring cup wheels, it is apparent that if desired the resilient mounting may be utilized for other types of grinding wheels.

It is apparent from the foregoing that I have provided a new and improved resilient mounting for abrasive wheels, particularly of the cup wheel type, which can withstand the severe usages encountered by cup wheels. The resilient mounting for the cup wheels provides a firm yet resilient mounting so that heavy torques can be applied to the cup wheel without danger of shearing the resilient members. The resilient members are placed under compression which greatly reduces the possibility of shearing them. The resilient mounting greatly reduces the impact which must be absorbed by the cup wheels and also eliminates excessive operator fatigue. The danger of fracture or breaking the cup wheels is greatly reduced thereby making possible greater safety for the operator. The spaces or corrugations 38 provided in the corrugated skirt have been found to be particularly advantageous because they serve to hold the pieces of the cup wheel within the guard member in the event of fracture of the cup wheel. The resilient mounting is readily demountable so that cup wheels can be easily replaced.

I claim:

1. In a resilient mounting for an abrasive cup wheel of the type adapted to be mounted on a rotating spindle, a rigid cup-shaped guard member adapted to be mounted on the spindle, the guard member having a size slightly greater than that of the cup wheel, the guard member having a centrally disposed opening, an annular member of resilient material disposed within the guard member and having an opening in registration with the opening in the guard member, means adapted to secure the cup wheel to the spindle and to retain the cup wheel in engagement with the annular resilient member, the annular resilient member serving to support the cup wheel above the bottom surface of the guard member, means formed of a resilient material disposed between the cup wheel and the means for securing the cup wheel to the spindle, and a resilient skirt-like member having corrugations disposed between the guard member and the side wall of the cup wheel.

2. In a resilient mounting for an abrasive cup wheel of the type adapted to be mounted on a rotating spindle, a rigid cup-shaped guard member adapted to be mounted on the spindle, the guard member having a size slightly greater than that of the cup wheel, the guard member having a centrally disposed opening, an annular member of resilient material disposed within the guard member and having an opening in registration with the opening in the guard member, means adapted to secure the cup wheel to the spindle and to retain the cup wheel in engagement with the annular resilient member, the annular resilient member serving to support the cup wheel above the surface of the guard member, means formed of a resilient material disposed between the cup wheel and the means for securing the cup wheel to the spindle, and a skirt-like member secured to the cup-shaped guard member and being adapted to engage the side wall of the cup wheel, said skirt-like member being formed with corrugations, the skirt-like member having a depth which is substantially greater than the space between the guard member and the cup wheel.

3. In a resilient mounting for an abrasive cup wheel of the type adapted to be mounted on a rotating spindle, a rigid cup-shaped guard member adapted to be mounted on the spindle, the guard member having a size slightly greater than that of the cup wheel so that there is a space between the side wall of the guard member and the side wall of the cup wheel, the guard member having a centrally disposed opening, an annular member of resilient material disposed within the guard member adjacent the bottom wall of the guard member and having an opening in registration with the opening in the guard member, means adapted to secure the cup wheel to the spindle and to retain the cup wheel in engagement with the annular resilient member, the annular resilient member serving to support the cup wheel above the bottom surface of the guard member, and means formed of resilient material disposed between the cup wheel and the means for securing the cup wheel to the spindle, said means for securing the cup wheel to the spindle consisting of a threaded hub having a radially extending flange, the resilient means disposed between the cup wheel and the means for securing the cup wheel to the spindle consisting of a cylindrical member of resilient material surrounding the hub and having a radially extending flange underlying the radially extending flange of the hub, said guard member being provided with an annular recess and said resilient annular member being disposed within the said annular recess of the guard member to position the cup wheel above the bottom wall of the guard member.

4. In a resilient mounting for an abrasive cup wheel of the type adapted to be mounted on a rotating spindle, a rigid cup-shaped guard member adapted to be mounted on the spindle, the guard member having a size slightly greater than that of the cup wheel so that there is a space between the side wall of the guard member and the side wall of the cup wheel wherein said wheel may oscillate freely, an annular member of resilient material disposed between the bottom wall of the guard member and the bottom wall of the cup wheel and supporting the cup-wheel above the bottom wall of the guard member, means adapted to secure the cup wheel to the spindle, and to retain the same in engagement with the annular resilient member, said securing means consisting of a hub having a radially extending flange, and means formed of resilient material disposed between the cup wheel and the securing means, said last named resilient means consisting of a cylindrical member surrounding the hub of the securing means and having a radially extending flange underlying the radially extending flange of said securing means.

5. A resilient mounting as in claim 4 together with a metallic bushing disposed within the cylindrical resilient member and engaging the hub, and a washer mounted on the upper side of the radially extending flange of the resilient member.

6. A resilient mounting as in claim 5 wherein the bushing and washer are bonded to the resilient member.

7. In a resilient mounting for an abrasive cup wheel of the type adapted to be mounted on a rotating spindle, a rigid cup-shaped guard member adapted to be mounted on the spindle, the guard member having a size slightly greater than that of the cup wheel so that space is provided between the side wall of the guard member and the side wall of the cup wheel wherein said wheel may oscillate freely, the guard member having a centrally disposed opening, an annular member of resilient material disposed within the guard member and having an opening in registration with the opening in the guard member, the annular resilient member serving to support the cup wheel above the bottom wall of the guard member, means adapted to secure the cup wheel to the spindle and to retain the cup wheel in engagement with the annular resilient member, said last named means comprising hub means having a radially extending flange, and means formed of resilient material disposed between the cup wheel and the means for securing the cup wheel to the spindle, said last named means including cylindrical and flanged portions adapted to underlie the hub means and radially extending flange portion of the means for securing the cup wheel to the spindle.

References Cited in the file of this patent

UNITED STATES PATENTS

| | | |
|---|---|---|
| 1,180,260 | Grice | Apr. 18, 1916 |
| 2,810,239 | Burleigh | Oct. 22, 1957 |
| 2,823,496 | Winter | Feb. 18, 1958 |